(12) United States Patent
Ghelichi et al.

(10) Patent No.: US 12,720,634 B2
(45) Date of Patent: Aug. 25, 2026

(54) BATTERY CURRENT LIMITING TECHNIQUES FOR DUAL SUBSCRIBER IDENTITY MODULE-DUAL ACTION OPERATION

(71) Applicant: QUALCOMM Incorporated, San Diego, CA (US)

(72) Inventors: Mahbod Ghelichi, San Diego, CA (US); Rishav Rej, San Diego, CA (US); James Francis Geekie, Carlsbad, CA (US); Cheol Hee Park, San Diego, CA (US); Manisha Priyadarshini, San Diego, CA (US); Andres Zacarias, San Diego, CA (US); Adam Hebein, San Diego, CA (US); Qingxin Chen, San Diego, CA (US); Uttam Pattanayak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 18/166,760

(22) Filed: Feb. 9, 2023

(65) Prior Publication Data

US 2023/0276522 A1 Aug. 31, 2023

Related U.S. Application Data

(60) Provisional application No. 63/268,593, filed on Feb. 25, 2022.

(51) Int. Cl.
*H04W 76/27* (2018.01)
*H04W 52/24* (2009.01)

(52) U.S. Cl.
CPC .......... *H04W 76/27* (2018.02); *H04W 52/24* (2013.01)

(58) Field of Classification Search
CPC ..... H04W 76/27; H04W 76/15; H04W 52/24; H04W 52/0277; H04W 40/08; H04W 88/06
See application file for complete search history.

(56) References Cited

U.S. PATENT DOCUMENTS

2008/0137566 A1 6/2008 Marholev et al.
2014/0200046 A1* 7/2014 Sikri .................. H04B 17/345 455/552.1

(Continued)

OTHER PUBLICATIONS

Partial International Search Report—PCT/US2023/062382—ISA/EPO—Jun. 6, 2023.

(Continued)

*Primary Examiner* — Jamal Javaid
(74) *Attorney, Agent, or Firm* — Harrity & Harrity, LLP

(57) ABSTRACT

Various aspects of the present disclosure generally relate to wireless communication. In some aspects, a mobile station may detect that a voltage fails to satisfy a performance threshold while operating in a dual subscriber identity module (SIM)-dual active (DSDA) mode associated with maintaining a first network connection in a first active mode concurrently with maintaining a second network connection in a second active mode. The mobile station may transition the first network connection from the first active mode to a standby mode based at least in part on detecting that the voltage fails to satisfy the performance threshold. Numerous other aspects are described.

27 Claims, 8 Drawing Sheets

(56) References Cited

U.S. PATENT DOCUMENTS

| | | | | |
|---|---|---|---|---|
| 2015/0230165 | A1* | 8/2015 | Aminaka | H04W 48/08 455/552.1 |
| 2019/0082393 | A1* | 3/2019 | Burugupalli | H04W 52/0261 |
| 2021/0014934 | A1* | 1/2021 | Lovlekar | H04W 4/60 |

OTHER PUBLICATIONS

International Search Report and Written Opinion—PCT/US2023/062382—ISA/EPO—Aug. 3, 2023.

* cited by examiner

300

BATTERY CURRENT LIMITING TECHNIQUES FOR DUAL SUBSCRIBER IDENTITY MODULE-DUAL ACTION OPERATION

CROSS-REFERENCE TO RELATED APPLICATION

This Patent application claims priority to U.S. Provisional Patent Application No. 63/268,593, filed on Feb. 25, 2022, entitled "BATTERY CURRENT LIMITING TECHNIQUES FOR DUAL SUBSCRIBER IDENTITY MODULE-DUAL ACTION OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for battery current limiting techniques for dual subscriber identity module-dual action (DSDA) operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include detecting, by the mobile station, that a voltage fails to satisfy a performance threshold while operating in a dual subscriber identity module (SIM)-dual active (DSDA) mode associated with maintaining a first network connection in a first active mode concurrently with maintaining a second network connection in a second active mode. The method may include transitioning, by the mobile station, the first network connection from the first active mode to a standby mode based at least in part on detecting that the voltage fails to satisfy the performance threshold. As one example, the mobile station may be a user equipment (UE).

Some aspects described herein relate to a method of wireless communication performed by a mobile station. The method may include operating, by the mobile station, in a DSDA mode associated with maintaining a first network connection in a first active mode concurrently with a second network connection in a second active mode, the operating comprising concurrently using a first power amplifier (PA) for maintaining the first network connection and a second PA for maintaining the second network connection. The method may include detecting, by the mobile station, that a voltage fails to satisfy a performance threshold while operating in the DSDA mode. The method may include transitioning, by the mobile station, from concurrently using the first PA for maintaining the first network connection and the second PA for maintaining the second network connection to time division multiplexing the first PA for maintaining the first network connection and the second network connection. As one example, the mobile station may be a UE.

Some aspects described herein relate to a non-transitory computer-readable medium that stores a set of instructions for wireless communication by a mobile station. The set of instructions, when executed by one or more processors of the mobile station, may cause the mobile station to detect that a voltage fails to satisfy a performance threshold while operating in a DSDA mode associated with maintaining a first network connection in a first active mode concurrently with maintaining a second network connection in a second active mode. The set of instructions, when executed by one or more processors of the mobile station, may cause the mobile station to transition the first network connection from the first active mode to a standby mode based at least in part on detecting that the voltage fails to satisfy the performance threshold. As one example, the mobile station may be a UE.

Some aspects described herein relate to a non-transitory computer-readable medium that stores a set of instructions for wireless communication by an operate in a DSDA mode associated with maintaining a first network connection in a first active mode concurrently with a second network connection in a second active mode, the instructions further configured to cause the mobile station to use a first PA to maintain the first network connection and a second PA to maintain the second network connection. As one example, the mobile station may be a UE.

Some aspects described herein relate to an apparatus for wireless communication. The apparatus may include means for detecting that a voltage fails to satisfy a performance threshold while operating in a DSDA mode associated with maintaining a first network connection in a first active mode concurrently with maintaining a second network connection in a second active mode. The apparatus may include means for transitioning the first network connection from the first active mode to a standby mode based at least in part on detecting that the voltage fails to satisfy the performance threshold.

Some aspects described herein relate to an apparatus for wireless communication. The apparatus may include means for operating in a DSDA mode associated with maintaining a first network connection in a first active mode concurrently with a second network connection in a second active mode, the maintaining comprising concurrently using a first PA for maintaining the first network connection and a second PA for maintaining the second network connection. The apparatus may include means for detecting that a voltage fails to satisfy a performance threshold while operating in the DSDA mode. The apparatus may include means for transitioning from concurrently using the first PA for maintaining the first network connection and the second PA for maintaining the second network connection to time division multiplexing the first PA for maintaining the first network connection and the second network connection.

Some aspects described herein relate to a mobile station for wireless communication. The mobile station may include a memory storing information; and one or more processors, coupled to the memory, and configured to, based at least in part on the information, cause the apparatus to detect that a voltage fails to satisfy a performance threshold while operating in a DSDA mode associated with maintaining a first network connection in a first active mode concurrently with maintaining a second network connection in a second active mode. The one or more processors may be configured to cause the apparatus to transition the first network connection from the first active mode to a standby mode based at least in part on detecting that the voltage fails to satisfy the performance threshold. As one example, the mobile station may be a UE.

Some aspects described herein relate to a mobile station for wireless communication. The mobile station may include a memory and one or more processors coupled to the memory. The one or more processors may be configured to operate in a DSDA mode associated with maintaining a first network connection in a first active mode concurrently with a second network connection in a second active mode, the one or more processors configured to cause the mobile station to operate in the DSDA mode based at least in part on concurrently using a first PA to maintain the first network connection and a second PA to maintain the second network connection. The one or more processors may be configured to detect that a voltage fails to satisfy a performance threshold while operating in the DSDA mode. The one or more processors may be configured to transition from concurrently using the first PA for maintaining the first network connection and the second PA for maintaining the second network connection to time division multiplexing the first PA for maintaining the first network connection and the second network connection. As one example, the mobile station may be a UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
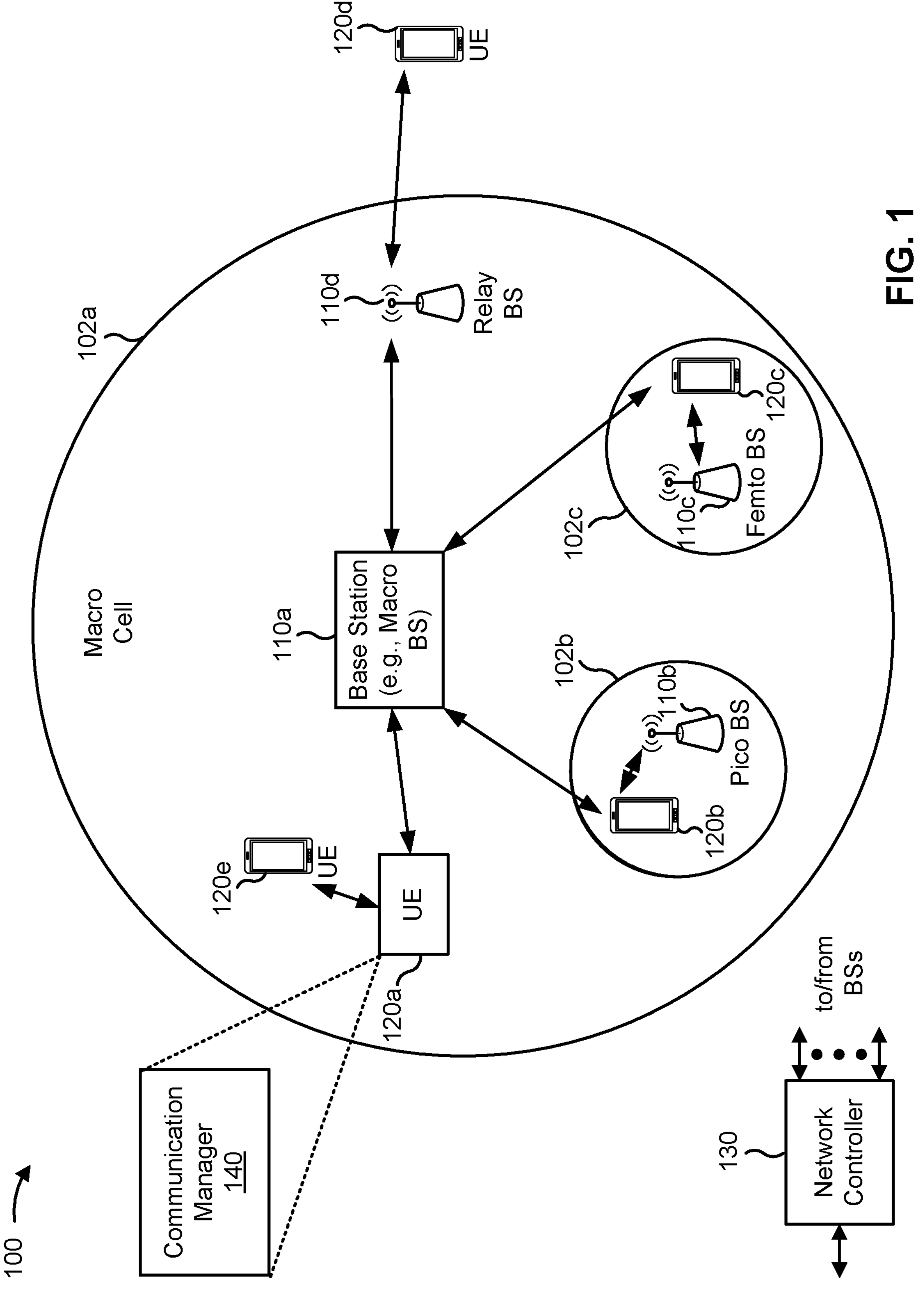
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the mobile station may include a communication manager 140. As described in more detail elsewhere herein, the communication manager 140 may detect that a voltage fails to satisfy a performance threshold while operating in a dual subscriber identity module (SIM)-dual active (DSDA) mode associated with maintaining a first network connection in a first active mode concurrently with maintaining a second network connection in a second active mode; and transition the first network connection from the first active mode to a standby mode based at least in part on detecting that the voltage fails to satisfy the performance threshold. Additionally, or alternatively, the communication manager 140 may perform one or more other operations described herein.

Alternatively or additionally, the communication manager 140 may enable the mobile station to operate in the DSDA mode based at least in part on concurrently using a first power amplifier (PA) to maintain the first network connection and a second PA to maintain the second network connection; detect that a voltage fails to satisfy a performance threshold while operating in the DSDA mode; and transition from concurrently using the first PA to maintain the first network connection and the second PA to maintain the second network connection to time division multiplexing the first PA to maintain the first network connection and the second network connection. Additionally, or alternatively, the communication manager 140 may perform one or more other operations described herein.

As indicated above, FIG. 1 is provided as an example. Other examples may differ from what is described with regard to FIG. 1.

Figure 2:
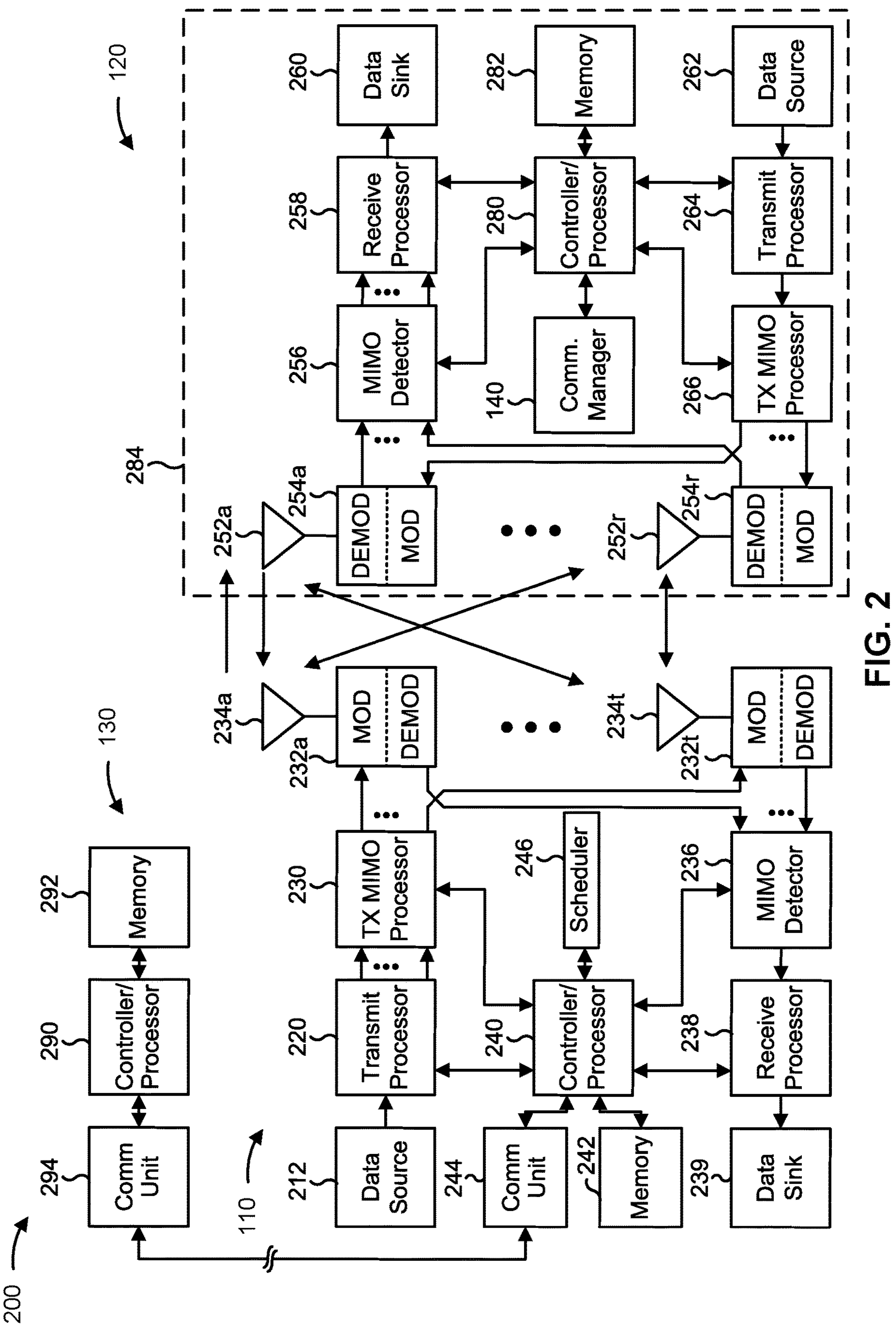
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with battery current limiting techniques for DSDA operation, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for detecting, by the UE 120, that a voltage fails to satisfy a performance threshold while operating in a DSDA mode associated with maintaining a first network connection in a first active mode concurrently with maintaining a second network connection in a second active mode; and/or means for transitioning, by the UE 120, the first network connection from the first active mode to a standby mode based at least in part on detecting that the voltage fails to satisfy the performance threshold. In some aspects, the means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282. As one example, the UE 120 may be a mobile station.

In some aspects, the UE 120 includes means for operating, by the UE 120, in DSDA mode associated with maintaining a first network connection in a first active mode concurrently with a second network connection in a second active mode, the operating comprising concurrently using a first PA for maintaining the first network connection and a second PA for maintaining the second network connection; means for detecting, by the UE 120, that a voltage fails to satisfy a performance threshold while operating in the DSDA mode; and/or means for transitioning, by the UE 120, from concurrently using the first PA for maintaining the first network connection and the second PA for maintaining the second network connection to time division multiplexing the first PA for maintaining the first network connection and the second network connection. In some aspects, the means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282. As one example, the UE 120 may be a mobile station.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
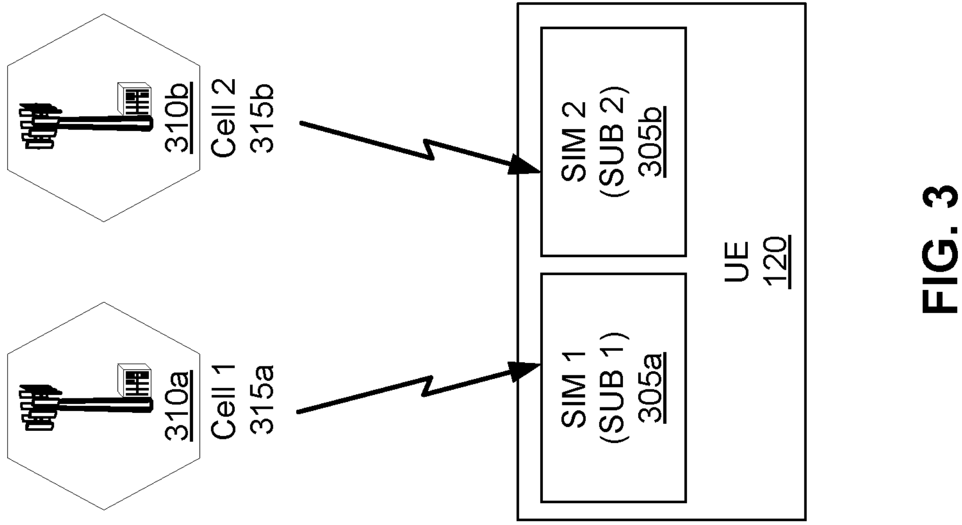
FIG. 3 is a diagram illustrating an example of a multi-subscriber identity module (SIM) UE, in accordance with the present disclosure.

FIG. 3 is a diagram illustrating an example 300 of a multi-SIM UE, in accordance with the present disclosure. As shown in FIG. 3, a UE 120 may be a multiple SIM (multi-SIM) UE that includes multiple SIMS (two or more SIMs), shown as a first SIM 305*a* and a second SIM 305*b*. The first SIM 305*a* may be associated with a first subscription (shown as SUB 1), and the second SIM 305*b* may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310*a* via a first cell 315*a* (shown as Cell 1) using the first SIM 305*a*. In this case, a first subscription (SUB 1) of the UE 120 may be used to access the first cell 315*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310*b* via a second cell 315*b* (shown as Cell 2) using the second SIM 305*b*. In this case, a second subscription (SUB 2) of the UE 120 may be used to access the second cell 315*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315 and the second cell 315*b* may be provided by the same base station. Thus, in some aspects, the first base station 310*a* and the second base station 310*b* may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a DSDA mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 305*a* (and the first subscription) at the same time as communicating using the second SIM 305*b* (and the second subscription). For example, when the UE 120 is in an active session (e.g., a voice call or another latency sensitive service, such as online gaming, stock trading, or an over-the-top (OTT) service) using the first SIM 305*a*, the UE 120 is capable of receiving a notification of a voice call using the second SIM 305*b* without interrupting communications that use the first SIM 305*a*, and without tuning or switching away from the first cell 315*a* to tune to the second cell 315*b*.

In a DSDS mode, the UE 120 is not capable of concurrent active communication using both SIMs of the UE 120. Thus, a UE 120 in the DSDS mode is not capable of communicating using the first SIM 305*a* (and the first subscription) at the same time as communicating using the second SIM 305*b* (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315*a* (as well as the first SIM 305*a* and the first subscription) uses an NR RAT and the second cell 315*b* (as well as the second SIM 305*b* and the second subscription) also uses the NR RAT. However, the UE 120 may not be capable of operating in a DSDA mode for NR+LTE, where one of the first cell 315*a* (as well as the first SIM 305*a* and the first subscription) uses an NR RAT and the second cell 315*b* (as well as the second SIM 305*b* and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

A UE may experience a voltage droop when a load on a battery of the UE is active. To illustrate, the battery may have a limited peak current capability, such as 50 milliamps peak current. When a load on the battery is active (e.g., when the UE is transmitting communications), the battery may experience a voltage drop (e.g., a voltage droop) that is proportional to the amount of current drawn from the battery. In some aspects, the current draw may activate overcurrent protection (OCP) to prevent overcurrent damage to hardware (e.g., chip sets) and may reduce functionality of the UE. Alternatively or additionally, the voltage droop may cause the voltage of the battery to fall below a threshold where battery performance and/or UE performance may suffer. As one example, the voltage droop may cause an Under Voltage Lockout (UVLO) in which the UE powers down unexpectedly, which may result in an unexpected termination of a network connection.

In some aspects, a UE may experience a voltage droop while operating in the DSDA mode in which the UE maintains two subscriptions and/or network connections in an active mode (e.g., a radio resource control (RRC) connected (RRC_CONNECTED) state). Maintaining two active network connections may cause a current draw from the battery that causes a voltage to drop below a performance threshold (e.g., a performance threshold associated with identifying potential overcurrent damage, initiating OCP, and/or preventing UVLO). To illustrate, the UE may transmit a first uplink communication using the first network connection and a second uplink communication using the second network connection concurrently, which may draw an amount of current that causes the voltage to drop below the performance threshold. As mentioned above, if the voltage drops below the performance threshold, the UE may experience damage to hardware or may experience UVLO.

Some techniques and apparatuses described herein provide battery current limiting techniques for DSDA operation. In some aspects, a mobile station (e.g., the UE 120)

may detect that a voltage fails to satisfy a performance threshold while operating in a DSDA mode. To illustrate, a mobile station operating in the DSDA mode may maintain a first network connection in a first active mode concurrently with a second network connection in a second active mode. As one example, the mobile station may maintain each network connection in an RRC_CONNECTED state as the active mode, while a standby mode may be an RRC_IDLE state and/or an RRC_INACTIVE state.

In some aspects, the voltage failing to satisfy the performance threshold may be considered a voltage droop associated with operating in the DSDA mode and/or associated with maintaining at least two active mode network connections. Based at least in part on identifying that the voltage fails to satisfy the performance threshold, the mobile station may transition one of the network connections from an active mode to a standby mode (e.g., the mobile station may initiate a transition from the DSDA mode to a DSDS mode). By transitioning one of the network connections to the standby mode, the mobile station may reduce a quantity of transmissions associated with the network connection operating in the standby mode and reduce a current draw on the battery. Reducing the current draw may mitigate hardware damage and/or the occurrence of UVLO while maintaining at least one network connection in an active mode (and thus enabling the mobile station to continue to communicate using that network connection).

While operating in the DSDA mode, the mobile station may concurrently use a first PA to operate a first transceiver associated with the first network connection and a second PA to operate a second transceiver associated with the second network connection. In some aspects, and based at least in part on detecting that the voltage fails to satisfy the performance threshold while operating in the DSDA mode, the mobile station may transition from concurrently using the first PA and the second PA to time division multiplexing (e.g., timesharing) a single PA to operate the first and second transceivers. For example, the mobile station may timeshare the single PA (e.g., the first PA or the second PA) by powering the first transceiver and not the second transceiver for a first time duration. For a second time duration, the mobile station may power the second transceiver and not the first transceiver. By timesharing the single PA between the first and second transceivers, and refraining from using additional PAs to power the first and second transceivers concurrently, the mobile station may reduce a current draw from a battery, mitigate hardware damage, and/or mitigate the occurrence of UVLO while concurrently maintaining at least two network connections in an active mode.

As indicated above, FIG. 3 is provided as an example. Other examples may differ from what is described with regard to FIG. 3.

Figure 4:
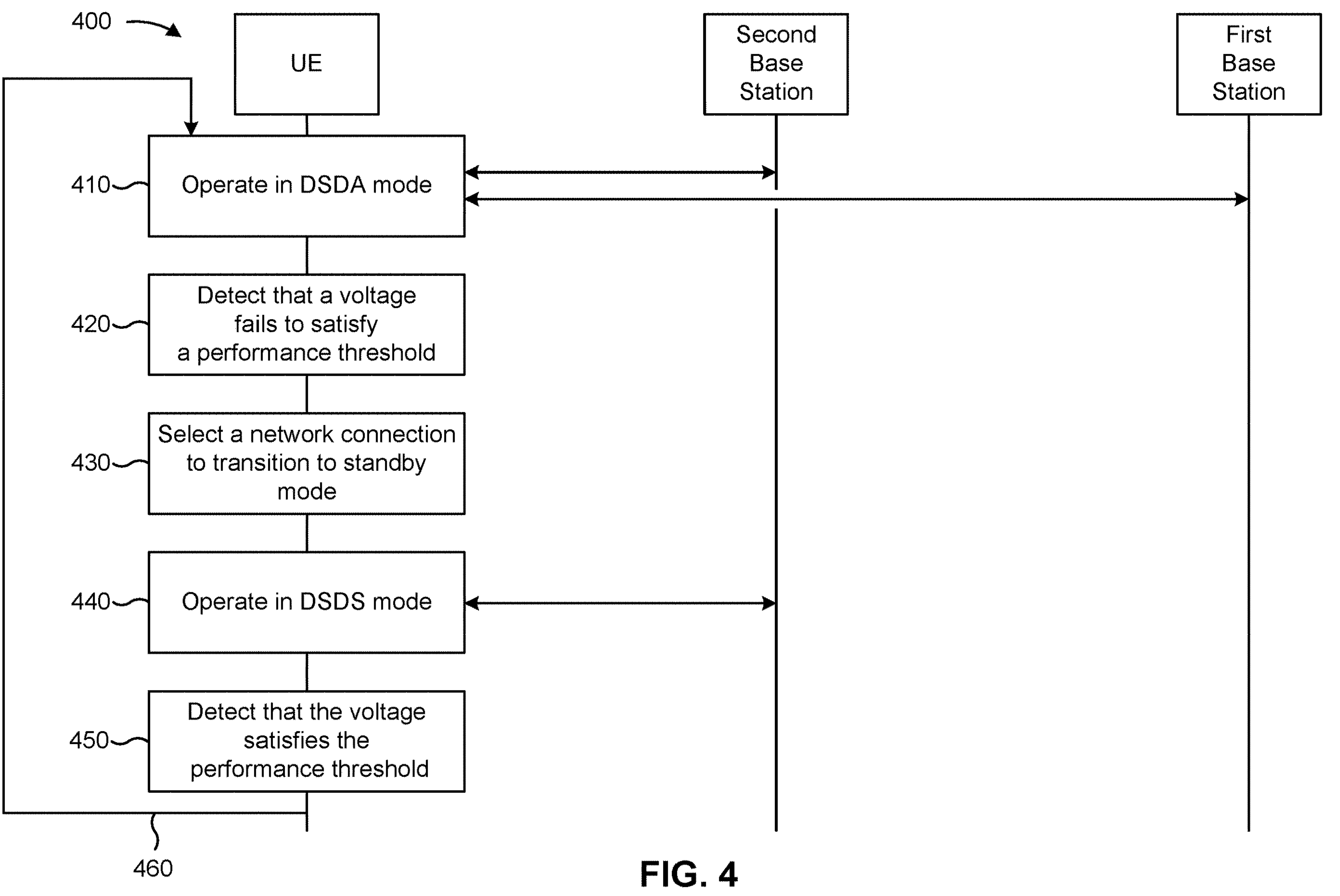
FIG. 4 is a diagram illustrating an example of a wireless communication process between a first base station, a second base station, and a UE in a wireless network in accordance with the present disclosure.

FIG. 4 is a diagram illustrating an example 400 of a wireless communication process between a first base station (e.g., a base station 110), a second base station (e.g., another base station 110), and a UE (e.g., the UE 120) in a wireless network (e.g., the wireless network 100) in accordance with the present disclosure. While the example 400 shows two base stations participating in the communication process, alternate or additional network entities may participate, such as a radio unit, a distributed unit, and/or a central unit of a distributed base station. For example, the first base station may include a network entity that controls a first radio unit, and the second base station may include a network entity (e.g., the same network entity or a different network entity) that controls a second radio unit. In some aspects, the first base station and the second base station may be co-located, while in other aspects, the first base station and the second base station may reside at different locations.

As shown by reference number 410, a UE (e.g., the UE 120) may operate in a DSDA mode. As part of operating in the DSDA mode, the UE may concurrently maintain a first network connection in a first active mode while maintaining a second network connection in a second active mode. In some examples, the first network connection may be associated with a first base station and the second network connection may be associated with a second, different base station. To illustrate, the UE may transmit and/or receive one or more active mode transmissions associated with the first network connection (e.g., transmissions that may occur while operating in an RRC_CONNECTED state). In some examples, the first network connection and the second network connection may be associated with a single base station. In some aspects, the UE may transmit and/or receive one or more active mode transmissions associated with the second network connection concurrently and/or contemporaneously with the one or more active mode transmissions associated with the first network connection. The first network connection may be associated with a first subscription and/or first SIM, and the second network connection may be associated with a second, different subscription and/or a second, different SIM. In some aspects, the UE maintains the first network connection concurrently with maintaining the second network connection mode based at least in part on using a first transceiver for the first network connection and a second transceiver for the second network connection.

As shown by reference number 420, the UE may detect that a voltage associated with a battery of the UE fails to satisfy a performance threshold at a first point in time, such as a first point in time that occurs while operating in the DSDA mode. To illustrate, the UE may periodically and/or continuously monitor a voltage associated with a battery of the UE, such as by measuring one or more voltage drops across terminals of the battery. For example, the UE may use a voltage probe and/or a voltameter to measure the voltage drop across the terminals of the battery. In some aspects, the UE may include a charger integrated circuit (IC) or a battery management IC to manage measurements of the voltage associated with the battery. The performance threshold may be based at least in part on preventing the UE from enabling UVLO and/or OCP mechanisms.

As shown by reference number 430, the UE may select a network connection (e.g., the first network connection or the second network connection) to transition to a standby mode. For example, the UE may select a network connection to transition to a standby mode based at least in part on detecting that the voltage fails to satisfy the performance threshold. As one example, the UE may select the network connection based at least in part on one or more metrics, such as one or more link quality metrics, one or more connection type metrics, one or more data traffic metrics, one or more data usage metrics, and/or one or more use case metrics. Alternatively or additionally, the UE may select the network connection based at least in part on scheduling information.

A link quality metric may indicate a link quality associated with a network connection, such as a signal-to-noise ratio (SNR), bit error rate (BER), RSRP, RSSI, RSRQ, and/or CQI. A connection type metric may indicate that a network connection is associated with a data connection type and/or a voice connection type. A data traffic metric may indicate one or more types of data traffic associated with a network connection, such as File Transfer Protocol (FTP) data traffic, Voice over Internet Protocol (VoIP) data traffic, cloud gaming data traffic, video streaming data traffic, conference call data traffic, and/or extended reality (XR) data traffic (e.g., virtual reality (VR) data traffic, augmented reality (AR) data traffic, and/or mixed reality (MR) data traffic). A use case metric may indicate one or more use case types associated with a network connection, such as an enhanced mobile broadband (eMBB) type, an Ultra Reliable Low Latency Communications (URLLC) type, or a massive Machine Type Communications (mMTC) type.

In some aspects, the UE may compare a metric associated with the first network connection (e.g., a first metric) to a metric associated with the second network connection (e.g., a second metric) and select the network connection to transition to the standby mode based at least in part on comparing the metrics. To illustrate, the UE may compare a link quality metric associated with the first network connection to a link quality metric associated with the second network connection, and determine the first network connection has a lower link quality (e.g., has lower SNR, has higher BER). Accordingly, the UE may select the first network connection as the network connection to transition to the standby mode.

Alternatively or additionally, the UE may prioritize the one or more metrics. To illustrate, a connection type metric may indicate the first network connection is associated with a data connection and that the second network connection is associated with a voice call and/or voice connection type. In some aspects, the UE may prioritize a voice connection type higher than a data connection type. Based at least in part on priority (e.g., the second network connection being associated with a voice connection and/or the first network connection being associated with a data connection), the UE may select the first network connection as the network connection to transition to the standby mode.

As another example, the UE may prioritize data traffic metrics and determine to transition a network connection with lower priority data traffic to a standby mode. As one example, the UE may prioritize VoIP data traffic higher than FTP data traffic. As another example, the UE may prioritize conference call data traffic higher than AR data traffic.

In some aspects, the one or more metrics may indicate data usage and/or projected data usage. To illustrate, a first data usage metric may indicate that the first network connection has a first amount of projected data usage over a time duration and a second data usage metric may indicate that the second network connection has a second amount of projected data usage over the time duration. The UE may select the first network connection as the network connection to transition to the standby mode based at least in part on the first data usage metric indicating that the first network connection uses less, and/or is projected to use less, data relative to the second network connection.

Alternatively or additionally, the UE may prioritize use case types (e.g., prioritize URLLC data higher than other data types) and determine to transition the network connection associated with a lower priority use case type to the standby mode. Such prioritization may be based at least in part on quality of service (QoS) flow identifiers, packet level priority indicators, or another indication of the priority of a communication.

In some aspects, the UE may select the first network connection based at least in part on scheduling information. To illustrate, the UE may analyze scheduling information associated with the first network connection for a future time duration and scheduling information associated with the second network connection for the same future time duration. The UE may select the first network connection to transition to the standby mode based at least in part on determining the first network connection has fewer scheduled transmissions relative to the second network connection for the future time duration.

As shown by reference number 440, the UE may transition a network connection, selected as described with regard to the reference number 430, to a standby mode. Thus, the UE may operate in a DSDS mode. To illustrate, the UE may transition the first network connection to an RRC_IDLE state or an RRC_INACTIVE state while maintaining an active mode (e.g., RRC_CONNECTED) associated with the second network connection. While the reference number 440 shows the UE communicating with the second base station (e.g., active mode transmissions associated with the second network connection), in some aspects, the UE may transmit and/or receive one or more standby mode transmissions (e.g., transmissions that may occur while operating in an RRC_IDLE or RRC_INACTIVE state) with the first base station. To illustrate, the one or more active mode transmissions may be associated with the UE transmitting uplink user data associated with streaming video while the one or more standby mode transmissions may be associated with the UE periodically monitoring for downlink transmissions from the first base station. Thus, the one or more standby mode transmissions may occur with less frequency, with reduced volume, and/or in less abundance relative to the one or more active mode transmissions, which reduces load on the UE's battery relative to maintaining two active connections. In some aspects, the UE may cease transmitting and/or receiving communications via a network connection while operating in the standby mode for that network connection (e.g., while continuing to communicate via the other network connection in the active mode).

As shown by reference number 450, the UE may detect that the voltage satisfies the performance threshold at a second point in time, such as a second point in time that occurs while the UE operates in the DSDS mode. Based at least in part on detecting that the voltage satisfies the performance threshold, and as shown by the reference number 460, the UE may transition to the DSDA mode (e.g., transition the first network connection to an active mode). In some examples, a performance threshold associated with transitioning to the DSDA mode may be the same as the performance threshold associated with transitioning to the DSDS mode. In some other examples, the performance threshold associated with transitioning to the DSDA mode may be different than the performance threshold associated with transitioning to the DSDS mode (for example, the performance threshold associated with transitioning to the DSDA mode may be higher than the performance threshold associated with transitioning to the DSDS mode, which may reduce a ping-pong effect in which the UE switches between the DSDA mode and the DSDS mode in rapid succession). In transitioning to the DSDA mode, the UE may concurrently maintain the first network connection in the first active mode while maintaining the second network connection in the second active mode, as described above with regard to the reference number 410.

As shown by the example 400, the UE may autonomously transition between operating in a DSDA mode and a DSDS mode (e.g., without instructions from a base station and/or without notifying a base station). However, in some aspects, the UE may notify the first base station when the UE transitions the first network connection to the standby mode and/or when the UE transitions the first network connection back to the active mode.

By transitioning one of multiple network connections to a standby mode when operating in the DSDA mode, the UE may reduce transmissions associated with the transitioned network connection and reduce a current draw on a battery. To illustrate, the UE may reduce power consumed by a transceiver associated with the transitioned network connection, which may reduce the current draw on a battery. The reduced current draw may improve voltage droop (e.g., may result in a voltage that satisfies a performance threshold), mitigate hardware damage, and/or mitigate the occurrence of UVLO.

As indicated above, FIG. 4 is provided as an example. Other examples may differ from what is described with regard to FIG. 4.

Figure 5:
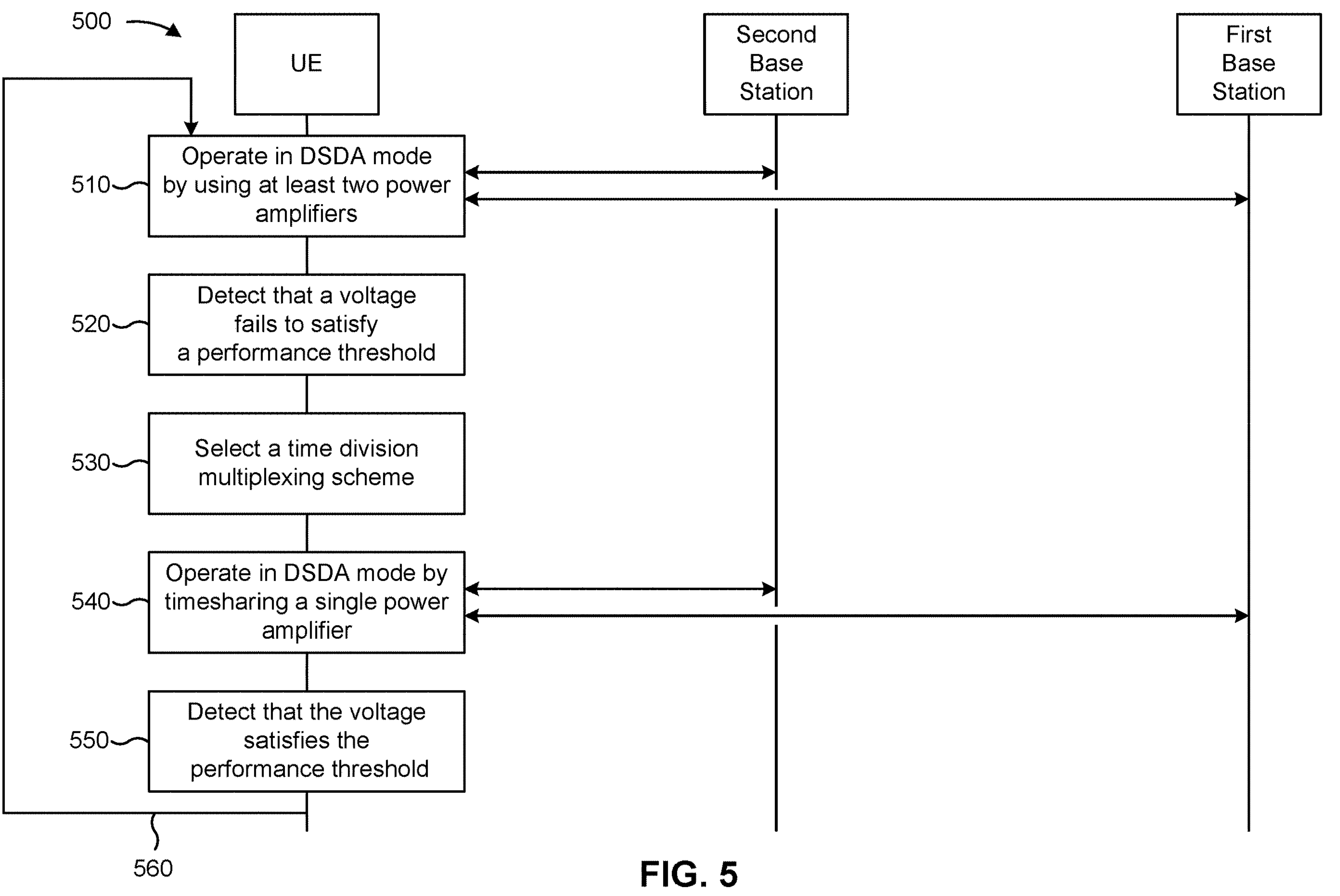
FIG. 5 is a diagram illustrating an example of a wireless communication process between a first base station, a second base station, and a UE in a wireless network in accordance with the present disclosure.

FIG. 5 is a diagram illustrating an example 500 of a wireless communication process between a first base station (e.g., a base station 110), a second base station (e.g., another base station 110), and a UE (e.g., the UE 120) in a wireless network (e.g., the wireless network 100) in accordance with the present disclosure. While the example 500 shows two base stations participating in the communication process, alternate or additional network entities may participate, such as a radio unit, a distributed unit, and/or a central unit of a distributed base station. For example, the first base station may include a network entity that controls a first radio unit, and the second base station may include a network entity (e.g., the same network entity or a different network entity) that controls a second radio unit. In some aspects, the first base station and the second base station may be co-located, while in other aspects, the first base station and the second base station may reside at different locations.

As shown by reference number 510, and similar to that described with regard to the reference number 410, a UE may operate in a DSDA mode by using at least two power amplifiers. To illustrate, the UE may concurrently maintain a first network connection in a first active mode while maintaining a second network connection a second active mode. In some aspects, the UE maintains the concurrent active mode network connections based at least in part on using a first power amplifier to operate a first transceiver associated with the first network connection and a second, different power amplifier to operate a second transceiver associated with the second network connection. Using the first power amplifier concurrently with the second power amplifier may sometimes be referred to as "power amplifier (PA) full concurrency."

As shown by reference number 520, and similar to that described with regard to the reference number 420, the UE may detect that a voltage associated with a battery of the UE fails to satisfy a performance threshold at a first point in time. The first point in time may occur while the UE operates in a DSDA mode and a PA full concurrency mode.

As shown by reference number 530, the UE may select a time division multiplexing scheme for sharing a single amplifier between the first transceiver associated with the first network connection and the second transceiver associated with the second network connection. To illustrate, and similar to that describe with regard to the reference number 430, the UE may analyze and/or prioritize one or more metrics associated with the first and/or second network connections, such as one or more link quality metrics, one or more connection type metrics, one or more data traffic metrics, one or more data usage metrics, and/or one or more use case metrics. For example, the UE may select a time division multiplexing scheme that indicates to apply the single power amplifier to a transceiver associated with a network connection with a higher priority connection type for a first time duration, and indicates to apply the single power amplifier to a transceiver associated with a network connection with a lower priority connection type for a second, shorter time duration. As another example, the UE may select a time division multiplexing scheme that indicates to apply the single power amplifier to a transceiver associated with a network connection with a high link quality for a longer time duration than a transceiver associated with another network connection with a lower link quality.

Alternatively or additionally, the UE may analyze scheduling information associated with the first network connection and the second network connection and select a time division multiplexing scheme based at least in part on scheduled transmissions. To illustrate, the UE may select a time division multiplexing scheme that applies the single power amplifier to the first transceiver over a first time duration associated with when transmissions are scheduled to occur using the first network connection and to the second transceiver over a second time duration associated with when transmissions are scheduled to occur using the second network connection.

In some aspects, the UE may select the time division multiplexing scheme based at least in part on a machine learning model trained using a machine learning algorithm. Machine learning involves computers learning from data to perform tasks. Machine learning algorithms are used to train machine learning models based at least in part on sample data, known as "training data." Once trained, machine learning models may be used to make predictions, decisions, or classifications relating to new observations. In some aspects, a machine learning algorithm may train a machine learning model to select a time division multiplexing scheme for sharing a single power amplifier between at least two transceivers based at least in part on the one or more metrics and/or scheduling information as further described.

By way of example, and not of limitation, the machine learning model may include and/or may be associated with one or more of a deep neural network (DNN), a clustering model, a Random Forest model, long-short term memory (LSTM) networks, gradient boosted algorithms, and/or K-means algorithms. In some implementations, the UE uses the machine learning model to analyze one or more metrics (e.g., one or more link quality metrics, one or more connection type metrics, one or more data traffic metrics, one or more data usage metrics, and/or one or more use case metrics) and/or and/or scheduling information and determine a timesharing scheme that provides a better user experience relative to other timesharing schemes. To illustrate, the machine learning model may be trained based at least in part on prioritizations as described above.

As shown by reference number 540, the UE may operate in the DSDA mode by timesharing a single power amplifier between the first transceiver associated with the first network connection and the second transceiver associated with the second network connection (e.g., the UE no longer operates in PA full concurrency). "Timesharing" may involve using a single power amplifier to power a first transceiver at a first time (or a set of first times) and a second transceiver at a second time (or a set of second times), where the first transceiver and the second transceiver are not powered at the same time. To illustrate, the UE may use the single power amplifier during a first time duration of the time division multiplexing scheme to operate the first transceiver. During the first time duration, the UE may communicate (e.g., transmit and/or receive) active mode transmissions associated with the first network connection and may not communicate active mode transmissions associated with the second network connection (e.g., the UE does not operate the second transceiver). During a second time duration of the time division multiplexing scheme, the UE may use the single power amplifier to operate the second transceiver and communicate active mode transmissions associated with the second network connection. The UE may not communicate active mode transmissions associated with the first network connection during the second time duration (e.g., the UE may not operate the first transceiver). In such examples, the first network connection and the second network connection may both remain active (that is, in an RRC connected state) throughout the timesharing of the single power amplifier. For example, the UE may refrain from transitioning the first network connection or the second network connection to an idle or inactive state during the timesharing of the single power amplifier. In some aspects, the UE may configure the timesharing such that radio link failure is not declared for either of the network connections.

As shown by reference number 550, and similar to that described with regard to the reference number 450, the UE may detect that the voltage satisfies the performance threshold at a second point in time, such as a second point in time associated with the UE sharing a single power amplifier as described with regard to the reference number 540. In some examples, a performance threshold associated with transitioning to the DSDA mode may be the same as the performance threshold associated with transitioning to the DSDS mode. In some other examples, the performance threshold associated with transitioning to the DSDA mode may be different than the performance threshold associated with transitioning to the DSDS mode (for example, the performance threshold associated with transitioning to the DSDA mode may be higher than the performance threshold associated with transitioning to the DSDS mode, which may reduce a ping-pong effect in which the UE switches between the DSDA mode and the DSDS mode in rapid succession). Based at least in part on detecting that the voltage satisfies the performance threshold, and as shown by the reference number 560, the UE may transition to PA full concurrency by using the first power amplifier to operate the first transceiver and the second power amplifier to operate the second transceiver.

By timesharing the single PA between the first and second transceivers, and refraining from using additional PAs to power the first and second transceivers, the UE may reduce a current draw from a battery relative to operating in PA full concurrency. The reduced current draw may reduce voltage droop (e.g., may result in a voltage that satisfies a performance threshold), mitigate hardware damage, and/or mitigate the occurrence of UVLO.

As indicated above, FIG. 5 is provided as an example. Other examples may differ from what is described with regard to FIG. 5.

Figure 6:
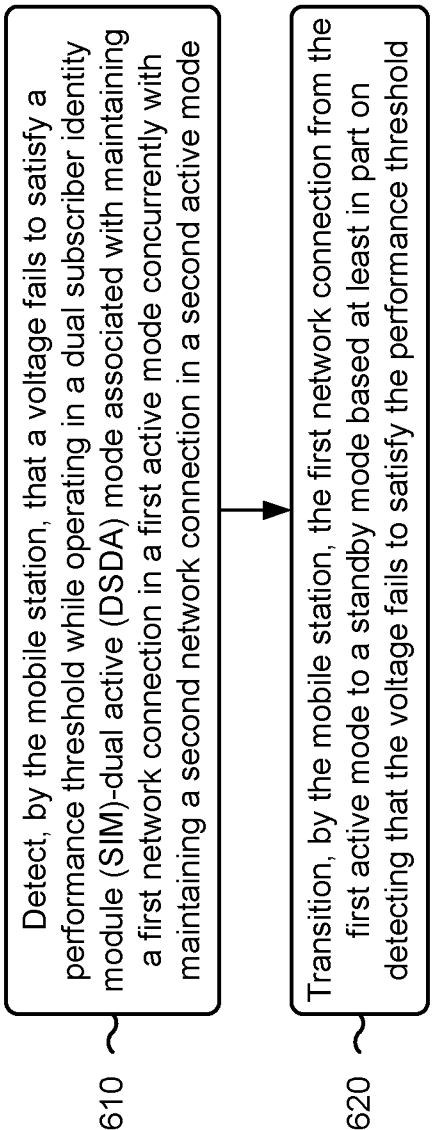
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with battery current limiting techniques for DSDA operation. In some aspects, the UE may be a mobile station.

As shown in FIG. 6, in some aspects, process 600 may include detecting that a voltage fails to satisfy a performance threshold while operating in a DSDA mode associated with maintaining a first network connection in a first active mode concurrently with maintaining a second network connection in a second active mode (block 610). For example, the UE (e.g., using communication manager 140 and/or detection component 808, depicted in FIG. 8) may detect that a voltage fails to satisfy a performance threshold while operating in a DSDA mode associated with maintaining a first network connection in a first active mode concurrently with maintaining a second network connection in a second active mode, as described above.

As further shown in FIG. 6, in some aspects, process 600 may include transitioning the first network connection from the first active mode to a standby mode based at least in part on detecting that the voltage fails to satisfy the performance threshold (block 620). For example, the UE (e.g., using communication manager 140 and/or link manager component 810, depicted in FIG. 8) may transition the first network connection from the first active mode to a standby mode based at least in part on detecting that the voltage fails to satisfy the performance threshold, as described above. By transitioning one of the network connections to the standby mode, the UE may reduce a quantity of transmissions associated with the network connection operating in the standby mode and reduce a current draw on the battery. Reducing the current draw may mitigate hardware damage and/or the occurrence of UVLO while maintaining at least one network connection in an active mode.

Process 600 may include additional aspects, such as any single aspect or any combination of aspects described below and/or in connection with one or more other processes described elsewhere herein.

In a first aspect, the first active mode is an RRC connected mode, and the standby mode is an RRC idle mode or an RRC inactive mode.

In a second aspect, alone or in combination with the first aspect, process 600 includes selecting the first network connection as a network connection to transition to the standby mode based at least in part on one or more metrics. This may allow the UE to select a network connection with better signal quality and reduce recovery errors at a receiver.

In a third aspect, alone or in combination with one or more of the first and second aspects, the one or more metrics comprise at least one of a link quality metric, a connection type metric, a data traffic metric, a data usage metric, or a use case type metric. This may allow the UE to prioritize the network connections based at least in part on communications occurring on each network connection, and transition the network connection with lower priority communications to the standby mode to provide a user with a better a user experience (e.g., by maintaining a network connection with higher priority communications in an active mode).

In a fourth aspect, alone or in combination with one or more of the first through third aspects, selecting the first network connection further comprises selecting the first network connection as the network connection to transition to the standby mode based at least in part on the connection type metric indicating that the second network connection is associated with a voice call.

In a fifth aspect, alone or in combination with one or more of the first through fourth aspects, the connection type metric is a first connection type metric, and selecting the first network connection as the network connection to transition to the standby mode further comprises selecting the first network connection as the network connection to transition to the standby mode based at least in part on a second connection type metric, of the one or more metrics, that indicates the first network connection is associated with a data connection.

In a sixth aspect, alone or in combination with one or more of the first through fifth aspects, selecting the first network connection further comprises selecting the first network connection as the network connection to transition based at least in part on a first link quality metric associated with the first network connection indicating a lower link quality relative to a second link quality associated with the second network connection.

In a seventh aspect, alone or in combination with one or more of the first through sixth aspects, selecting the first network connection to transition to the standby mode further comprises selecting the first network connection as the network connection to transition to the standby mode based at least in part on a first data usage metric of the one or more metrics that indicates the first network connection uses less data relative to the second network connection.

In an eighth aspect, alone or in combination with one or more of the first through seventh aspects, detecting that the voltage fails to satisfy the performance threshold comprises detecting that the voltage fails to satisfy the performance threshold at a first point in time, and process 600 further comprises detecting that the voltage satisfies the performance threshold at a second point in time, and transitioning the first network connection from the standby mode to the first active mode based at least in part on detecting that the voltage satisfies the performance threshold at the second point in time.

In a ninth aspect, alone or in combination with one or more of the first through eighth aspects, transitioning the first network connection from the standby mode to the first active mode further comprises transitioning the first network connection to the first active mode based at least in part on receiving user input, or transitioning the first network connection to the first active mode autonomously.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
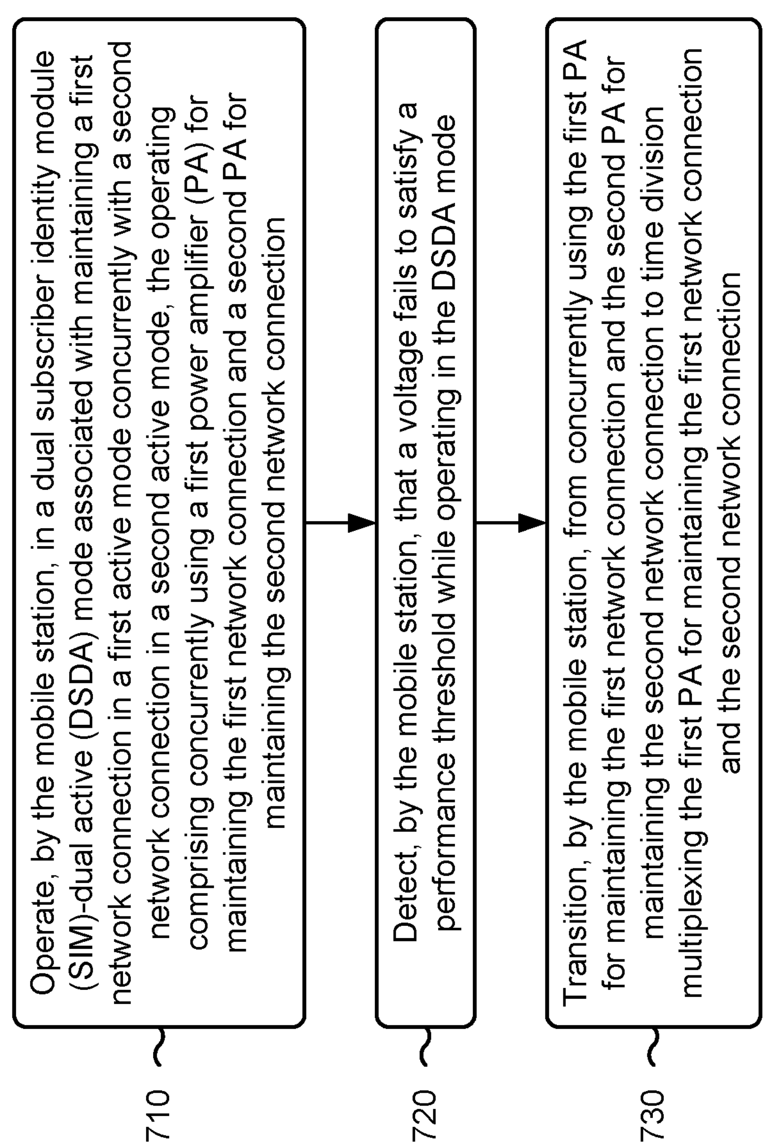
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., the UE 120) performs operations associated with battery current limiting techniques for DSDA operation. In some aspects, the UE may be a mobile station.

As shown in FIG. 7, in some aspects, process 700 may include operating in a DSDA mode associated with maintaining a first network connection in a first active mode concurrently with a second network connection in a second active mode, the operating comprising concurrently using a first PA for maintaining the first network connection and a second PA for maintaining the second network connection (block 710). For example, the UE (e.g., using communication manager 140 and/or link manager component 810, depicted in FIG. 8) may operate in a DSDA mode associated with maintaining a first network connection in a first active mode concurrently with a second network connection in a second active mode, the operating comprising concurrently using a PA for maintaining the first network connection and a second PA for maintaining the second network connection, as described above.

As further shown in FIG. 7, in some aspects, process 700 may include detecting that a voltage fails to satisfy a performance threshold while operating in the DSDA mode (block 720). For example, the UE (e.g., using communication manager 140 and/or detection component 808, depicted in FIG. 8) may detect that a voltage fails to satisfy a performance threshold while operating in the DSDA mode, as described above.

As further shown in FIG. 7, in some aspects, process 700 may include transitioning from concurrently using the first PA for maintaining the first network connection and the second PA for maintaining the second network connection to time division multiplexing the first PA for maintaining the first network connection and the second network connection (block 730). For example, the UE (e.g., using communication manager 140 and/or power amplifier sharing manager component 812, depicted in FIG. 8) may transition from concurrently using the first PA for maintaining the first network connection and the second PA for maintaining the second network connection to time division multiplexing the first PA for maintaining the first network connection and the second network connection, as described above. By time-sharing the single PA between the first and second transceivers, and refraining from using additional PAs to power the first and second transceivers concurrently, the UE may reduce a current draw from a battery, mitigate hardware damage, and/or mitigate the occurrence of UVLO while concurrently maintaining at least two network connections in an active mode.

Process 700 may include additional aspects, such as any single aspect or any combination of aspects described below and/or in connection with one or more other processes described elsewhere herein.

In a first aspect, process 700 includes selecting a time division multiplexing scheme for the first PA based at least in part on preventing a first uplink transmission associated with the first network connection from being concurrent with a second uplink transmission associated with the second network connection.

In a second aspect, alone or in combination with the first aspect, process 700 includes selecting a time division multiplexing scheme for the first PA based at least in part on at least one of a first transmission schedule associated with the first network connection, or a second transmission schedule associated with the second network connection. This allows the UE to minimize disruptions to each network connection by scheduling the PA to power each respective transceiver based at least in part on when the respective network connection has scheduled transmissions.

In a third aspect, alone or in combination with one or more of the first and second aspects, process 700 includes selecting a time division multiplexing scheme based at least in part on at least one of a link quality metric, a connection type metric, a data traffic metric, a data usage metric, or a use case type metric. This may allow the UE to prioritize the network connections based at least in part on communications occurring on each network connection, and schedule the PA to power each respective transceiver based at least in part on transmitting and/or receiving higher priority communications to provide a user with a better a user experience (e.g., by reducing a loss of high priority communications based at least in part on an inactive transceiver).

In a fourth aspect, alone or in combination with one or more of the first through third aspects, detecting that the voltage fails to satisfy the performance threshold comprises detecting that the voltage fails to satisfy the performance threshold at a first point in time, and the method further comprises detecting that the voltage satisfies the performance threshold at a second point in time, and transitioning from time division multiplexing the first PA for maintaining the first network connection and the second network connection to concurrently using the first PA for maintaining the first network connection and the second PA for maintaining the second network connection based at least in part on detecting that the voltage satisfies the performance threshold at the second point in time.

In a fifth aspect, alone or in combination with one or more of the first through fourth aspects, transitioning to concurrently using the first PA for maintaining the first network connection and the second PA for maintaining the second network connection is based at least in part on receiving user input.

In a sixth aspect, alone or in combination with one or more of the first through fifth aspects, transitioning to concurrently using the first PA for maintaining the first network connection and the second PA for maintaining the second network connection is autonomous.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
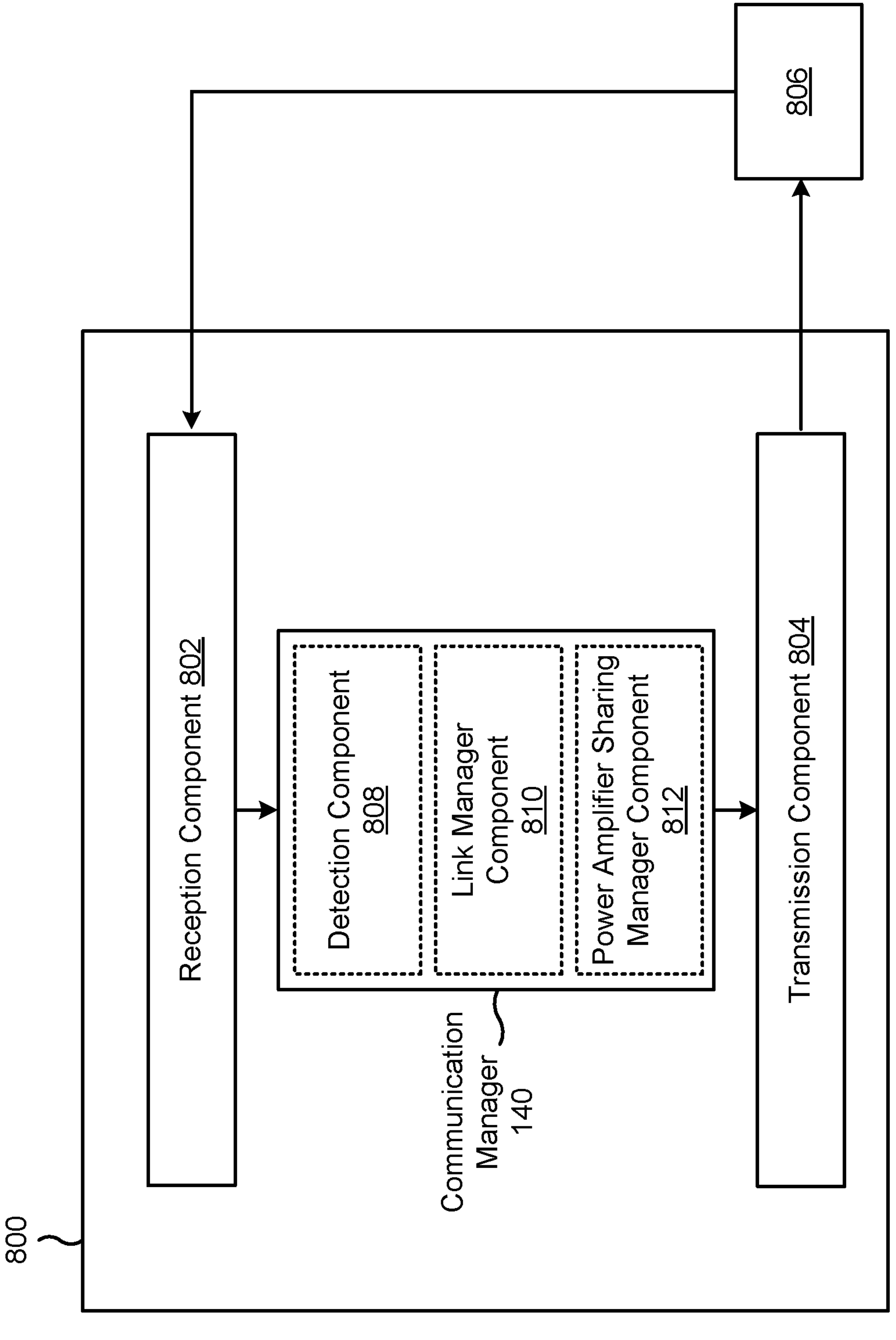
FIG. 8 is a diagram of an example apparatus for wireless communication.

FIG. 8 is a diagram of an example apparatus 800 for wireless communication. The apparatus 800 may be a UE (e.g., the UE 120) and/or a mobile station, or a UE (e.g., the UE 120) and/or mobile station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a detection component 808, a link manager component 810, and/or a power amplifier sharing manager component 812, among other examples.

In some aspects, the apparatus 800 may be configured to perform one or more operations described herein in connection with FIGS. 3-7. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The detection component 808 may detect that a voltage fails to satisfy a performance threshold while operating in a DSDA mode associated with maintaining a first network connection in a first active mode concurrently with maintaining a second network connection in a second active mode. The link manager component 810 may transition the first network connection from the first active mode to a standby mode based at least in part on detecting that the voltage fails to satisfy the performance threshold.

The link manager component 810 may select the first network connection as a network connection to transition to the standby mode based at least in part on one or more metrics.

The communication manager 140 may operate the apparatus in a DSDA mode associated with maintaining a first network connection in a first active mode concurrently with a second network connection in a second active mode, the operating comprising concurrently using a first PA for maintaining the first network connection and a second PA for maintaining the second network connection. The detection component 808 may detect that a voltage fails to satisfy a performance threshold while operating in the DSDA mode. The power amplifier sharing manager component 812 may transition from concurrently using the first PA for maintaining the first network connection and the second PA for maintaining the second network connection to time division multiplexing the first PA for maintaining the first network connection and the second network connection.

The link manager component 810 may select a time division multiplexing scheme for the first PA based at least in part on preventing a first uplink transmission associated with the first network connection from being concurrent with a second uplink transmission associated with the second network connection.

The link manager component 810 may select a time division multiplexing scheme for the first PA based at least in part on at least one of a first transmission schedule associated with the first network connection, or a second transmission schedule associated with the second network connection.

The link manager component 810 may select a time division multiplexing scheme based at least in part on at least one of a link quality metric, a connection type metric, a data traffic metric, a data usage metric, or a use case type metric.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a mobile station, comprising: detecting, by the mobile station, that a voltage fails to satisfy a performance threshold while operating in a dual subscriber identity module (SIM)-dual active (DSDA) mode associated with maintaining a first network connection in a first active mode concurrently with maintaining a second network connection in a second active mode; and transitioning, by the mobile station, the first network connection from the first active mode to a standby mode based at least in part on detecting that the voltage fails to satisfy the performance threshold.

Aspect 2: The method of Aspect 1, wherein the first active mode is a radio resource control (RRC) connected mode, and wherein the standby mode is an RRC idle mode or an RRC inactive mode.

Aspect 3: The method of Aspect 1 or Aspect 2, further comprising: selecting the first network connection as a network connection to transition to the standby mode based at least in part on one or more metrics.

Aspect 4: The method of Aspect 3, wherein the one or more metrics comprise at least one of: a link quality metric, a connection type metric, a data traffic metric, a data usage metric, or a use case type metric.

Aspect 5: The method of Aspect 4, wherein selecting the first network connection further comprises: selecting the first network connection as the network connection to transition to the standby mode based at least in part on the connection type metric indicating that the second network connection is associated with a voice call.

Aspect 6: The method of Aspect 5, wherein the connection type metric is a first connection type metric, and wherein selecting the first network connection as the network connection to transition to the standby mode further comprises: selecting the first network connection as the network connection to transition to the standby mode based at least in part on a second connection type metric, of the one or more metrics, that indicates the first network connection is associated with a data connection.

Aspect 7: The method of Aspect 4, wherein selecting the first network connection further comprises: selecting the first network connection as the network connection to transition based at least in part on a first link quality metric associated with the first network connection indicating a lower link quality relative to a second link quality associated with the second network connection.

Aspect 8: The method of Aspect 4, wherein selecting the first network connection to transition to the standby mode further comprises: selecting the first network connection as the network connection to transition to the standby mode based at least in part on a first data usage metric of the one or more metrics that indicates the first network connection uses less data relative to the second network connection.

Aspect 9: The method of any one of Aspects 1-8, wherein detecting that the voltage fails to satisfy the performance threshold comprises detecting that the voltage fails to satisfy the performance threshold at a first point in time, and wherein the method further comprises: detecting that the voltage satisfies the performance threshold at a second point in time; and transitioning the first network connection from the standby mode to the first active mode based at least in part on detecting that the voltage satisfies the performance threshold at the second point in time.

Aspect 10: The method of Aspect 9, wherein transitioning the first network connection from the standby mode to the first active mode further comprises: transitioning the first network connection to the first active mode based at least in part on receiving user input; or transitioning the first network connection to the first active mode autonomously.

Aspect 11: A method of wireless communication performed by a mobile station, comprising: operating, by the mobile station, in a dual subscriber identity module (SIM)-dual active (DSDA) mode associated with maintaining a first network connection in a first active mode concurrently with a second network connection in a second active mode, the operating comprising concurrently using a first power amplifier (PA) for maintaining the first network connection and a second PA for maintaining the second network connection; detecting, by the mobile station, that a voltage fails to satisfy a performance threshold while operating in the DSDA mode; and transitioning, by the mobile station, from concurrently using the first PA for maintaining the first network connection and the second PA for maintaining the second network connection to time division multiplexing the first PA for maintaining the first network connection and the second network connection.

Aspect 12: The method of Aspect 11, further comprising: selecting a time division multiplexing scheme for the first PA based at least in part on preventing a first uplink transmission associated with the first network connection from being concurrent with a second uplink transmission associated with the second network connection.

Aspect 13: The method of Aspect 11 or Aspect 12, further comprising: selecting a time division multiplexing scheme for the first PA based at least in part on at least one of: a first transmission schedule associated with the first network connection, or a second transmission schedule associated with the second network connection.

Aspect 14: The method of any one of Aspects 11-13, further comprising: selecting a time division multiplexing scheme based at least in part on at least one of: a link quality metric, a connection type metric, a data traffic metric, a data usage metric, or a use case type metric.

Aspect 15: The method of any one of Aspects 11-14, wherein detecting that the voltage fails to satisfy the performance threshold comprises detecting that the voltage fails to satisfy the performance threshold at a first point in time, and the method further comprises: detecting that the voltage satisfies the performance threshold at a second point in time; and transitioning from time division multiplexing the first PA for maintaining the first network connection and the second network connection to concurrently using the first PA for maintaining the first network connection and the second PA for maintaining the second network connection based at least in part on detecting that the voltage satisfies the performance threshold at the second point in time.

Aspect 16: The method of Aspect 15, wherein transitioning to concurrently using the first PA for maintaining the first network connection and the second PA for maintaining the second network connection is based at least in part on receiving user input.

Aspect 17: The method of Aspect 15, wherein transitioning to concurrently using the first PA for maintaining the first network connection and the second PA for maintaining the second network connection is autonomous.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:

one or more memories; and one or more processors, the one or more processors, individually or collectively and based at least in part on information stored in the one or more memories, being configured to:

detect that a voltage fails to satisfy a performance threshold at a first point in time while operating in a dual subscriber identity module (SIM)-dual active (DSDA) mode associated with maintaining a first network connection in a first active mode concurrently with maintaining a second network connection in a second active mode;

select, based at least in part on the voltage failing to satisfy the performance threshold, the first network connection based on a comparison of a metric of one or more metrics associated with the first network connection to a second metric of one or more second metrics associated with the second network connection;

transition the first network connection from the first active mode to a standby mode based at least in part on the voltage failing to satisfy the performance threshold;

detect that the voltage satisfies the performance threshold at a second point in time; and transition the first network connection from the standby mode to the first active mode based at least in part on detecting that the voltage satisfies the performance threshold at the second point in time.

2. The apparatus of claim 1, wherein the first active mode is a radio resource control (RRC) connected mode, and wherein the standby mode is an RRC idle mode or an RRC inactive mode.

3. The apparatus of claim 1, wherein the one or more metrics comprise at least one of:

a link quality metric, a connection type metric, a data traffic metric, a data usage metric, or a use case type metric.

4. The apparatus of claim 3, wherein the one or more processors, to select the first network connection, are configured to, based at least in part on further information stored in the one or more memories, cause the apparatus to:

select the first network connection as the network connection to transition to the standby mode based at least in part on the connection type metric indicating that the second network connection is associated with a voice call.

5. The apparatus of claim 4, wherein the connection type metric is a first connection type metric, and wherein the one or more processors, to select the first network connection as the network connection to transition to the standby mode, are further configured to, based at least in part on further information stored in the one or more memories, cause the apparatus to:

select the first network connection as the network connection to transition to the standby mode based at least in part on a second connection type metric, of the one or more metrics, that indicates the first network connection is associated with a data connection.

6. The apparatus of claim 3, wherein the one or more processors, to select the first network connection, are configured to, based at least in part on further information stored in the one or more memories, cause the apparatus to:

select the first network connection as the network connection to transition based at least in part on a first link quality metric associated with the first network connection indicating a lower link quality relative to a second link quality associated with the second network connection.

7. The apparatus of claim 3, wherein the one or more processors, to select the first network connection to transition to the standby mode, are configured to, based at least in part on further information stored in the one or more memories, cause the apparatus to:

select the first network connection as the network connection to transition to the standby mode based at least in part on a first data usage metric of the one or more metrics that indicates the first network connection uses less data relative to the second network connection.

8. A method of wireless communication performed by a mobile station, comprising:

detecting, by the mobile station, that a voltage fails to satisfy a performance threshold at a first point in time while operating in a dual subscriber identity module (SIM)-dual active (DSDA) mode associated with maintaining a first network connection in a first active mode concurrently with maintaining a second network connection in a second active mode;

selecting, based at least in part on detecting that the voltage fails to satisfy the performance threshold, the first network connection based on comparing a metric of one or more metrics associated with the first network connection to a second metric of one or more second metrics associated with the second network connection;

transitioning, by the mobile station, the first network connection from the first active mode to a standby mode based at least in part on detecting that the voltage fails to satisfy the performance threshold;

detecting that the voltage satisfies the performance threshold at a second point in time; and transitioning the first network connection from the standby mode to the first active mode based at least in part on detecting that the voltage satisfies the performance threshold at the second point in time.

9. The method of claim 8, wherein the first active mode is a radio resource control (RRC) connected mode, and wherein the standby mode is an RRC idle mode or an RRC inactive mode.

10. The method of claim 8, wherein the one or more metrics comprise at least one of:

a link quality metric, a connection type metric, a data traffic metric, a data usage metric, or a use case type metric.

11. The method of claim 10, wherein selecting the first network connection further comprises:

selecting the first network connection as the network connection to transition to the standby mode based at least in part on the connection type metric indicating that the second network connection is associated with a voice call.

12. The method of claim 11, wherein the connection type metric is a first connection type metric, and wherein selecting the first network connection as the network connection to transition to the standby mode further comprises:

selecting the first network connection as the network connection to transition to the standby mode based at least in part on a second connection type metric, of the one or more metrics, that indicates the first network connection is associated with a data connection.

13. The method of claim 10, wherein selecting the first network connection further comprises:

selecting the first network connection as the network connection to transition based at least in part on a first link quality metric associated with the first network connection indicating a lower link quality relative to a second link quality associated with the second network connection.

14. The method of claim 10, wherein selecting the first network connection to transition to the standby mode further comprises:

selecting the first network connection as the network connection to transition to the standby mode based at least in part on a first data usage metric of the one or more metrics that indicates the first network connection uses less data relative to the second network connection.

15. A non-transitory computer-readable medium storing a set of instructions for wireless communication, the set of instructions comprising:

one or more instructions that, when executed by one or more processors of a mobile station, cause the mobile station to:

detect that a voltage fails to satisfy a performance threshold at a first point in time while operating in a dual subscriber identity module (SIM)-dual active (DSDA) mode associated with maintaining a first network connection in a first active mode concurrently with maintaining a second network connection in a second active mode;

select, based at least in part on the voltage failing to satisfy the performance threshold, the first network connection based on a comparison of a metric of one or more metrics associated with the first network connection to a second metric of one or more second metrics associated with the second network connection;

transition the first network connection from the first active mode to a standby mode based at least in part on the voltage failing to satisfy the performance threshold;

detect that the voltage satisfies the performance threshold at a second point in time; and transition the first network connection from the standby mode to the first active mode based at least in part on detecting that the voltage satisfies the performance threshold at the second point in time.

16. The non-transitory computer-readable medium of claim 15, wherein the first active mode is a radio resource control (RRC) connected mode, and wherein the standby mode is an RRC idle mode or an RRC inactive mode.

17. The non-transitory computer-readable medium of claim 15, wherein the one or more metrics comprise at least one of:

a link quality metric, a connection type metric, a data traffic metric, a data usage metric, or a use case type metric.

18. The non-transitory computer-readable medium of claim 17, wherein the one or more instructions, that cause the mobile station to select the first network connection, cause the mobile station to:

select the first network connection as the network connection to transition to the standby mode based at least in part on the connection type metric indicating that the second network connection is associated with a voice call.

19. The non-transitory computer-readable medium of claim 18, wherein the connection type metric is a first connection type metric, and wherein the one or more instructions, that cause the mobile station to select the first network connection as the network connection to transition to the standby mode, cause the mobile station to:

select the first network connection as the network connection to transition to the standby mode based at least in part on a second connection type metric, of the one or more metrics, that indicates the first network connection is associated with a data connection.

20. The non-transitory computer-readable medium of claim 17, wherein the one or more instructions, that cause the mobile station to select the first network connection, cause the mobile station to:

select the first network connection as the network connection to transition based at least in part on a first link quality metric associated with the first network connection indicating a lower link quality relative to a second link quality associated with the second network connection.

21. The non-transitory computer-readable medium of claim 17, wherein the one or more instructions, that cause the mobile station to select the first network connection to transition to the standby mode, cause the mobile station to:

select the first network connection as the network connection to transition to the standby mode based at least in part on a first data usage metric of the one or more metrics that indicates the first network connection uses less data relative to the second network connection.

22. An apparatus for wireless communication, comprising:

means for detecting that a voltage fails to satisfy a performance threshold at a first point in time while operating in a dual subscriber identity module (SIM)-dual active (DSDA) mode associated with maintaining a first network connection in a first active mode concurrently with maintaining a second network connection in a second active mode;

means for selecting, based at least in part on detecting that the voltage fails to satisfy the performance threshold, the first network connection based on comparing a metric of one or more metrics associated with the first network connection to a second metric of one or more second metrics associated with the second network connection;

means for transitioning the first network connection from the first active mode to a standby mode based at least in part on detecting that the voltage fails to satisfy the performance threshold;

means for detecting that the voltage satisfies the performance threshold at a second point in time; and means for transitioning the first network connection from the standby mode to the first active mode based at least in part on detecting that the voltage satisfies the performance threshold at the second point in time.

23. The apparatus of claim 22, wherein the first active mode is a radio resource control (RRC) connected mode, and wherein the standby mode is an RRC idle mode or an RRC inactive mode.

24. The apparatus of claim 22, wherein the one or more metrics comprise at least one of:

a link quality metric, a connection type metric, a data traffic metric, a data usage metric, or a use case type metric.

25. The apparatus of claim 24, wherein the means for selecting the first network connection further comprise:

means for selecting the first network connection as the network connection to transition to the standby mode based at least in part on the connection type metric indicating that the second network connection is associated with a voice call.

26. The apparatus of claim 25, wherein the connection type metric is a first connection type metric, and wherein the means for selecting the first network connection as the network connection to transition to the standby mode further comprise:

means for selecting the first network connection as the network connection to transition to the standby mode based at least in part on a second connection type metric, of the one or more metrics, that indicates the first network connection is associated with a data connection.

27. The apparatus of claim 24, wherein the means for selecting the first network connection further comprise:

means for selecting the first network connection as the network connection to transition based at least in part on a first link quality metric associated with the first network connection indicating a lower link quality relative to a second link quality associated with the second network connection.

* * * * *